July 12, 1966 A. G. W. EDMUNDS 3,261,002

INFORMATION STORAGE SYSTEMS

Original Filed March 18, 1957 2 Sheets-Sheet 1

INVENTOR

A. G. W. Edmunds

BY Wenderoth, Lind and Ponack,

ATTORNEYS

INFORMATION STORAGE SYSTEMS

Original Filed March 18, 1957 2 Sheets-Sheet 2

INVENTOR
ARTHUR G. W. EDMUNDS
BY Wenderoth, Lind & Ponack
ATTORNEYS

United States Patent Office 3,261,002

Patented July 12, 1966

3,261,002

INFORMATION STORAGE SYSTEMS

Arthur Garnet Wolseley Edmunds, Middlesex, England, assignor to Elliot Brothers (London) Limited, London, England, a British company Original application Mar. 18, 1957, Ser. No. 646,779, now Patent No. 3,016,524, dated Jan. 9, 1962. Divided and this application Jan. 8, 1962, Ser. No. 164,828

Claims priority, application Great Britain, Mar. 20, 1956, 8,754/56

6 Claims. (340—174)

This application is a division of my application Serial No. 646,779, filed March 18, 1957, now U.S. Patent No. 3,016,524.

This invention relates to information storage systems and particularly to systems of the kind in which information can be stored permanently in the sense that it can be retained in the store as long as is desired although in some circumstances it can be erased when no longer required and replaced by new information.

In systems of this kind it is necessary not only to provide means for recording information in the store but also means for reproducing or reading the stored information. The recording or writing operation must be capable of being accurately and reliably performed so that the required information is stored without spurious signals which might render the information when reproduced unintelligible. While the reproducing or reading operation must likewise be capable of being accurately and reliably performed, not only so that the required information can be obtained from the store with a low noise level, but also so that a rapid access may be had to the desired information. A further problem is to store the maximum information in the minimum volume and preferably without involving the use of relatively moving parts.

It is accordingly a principal object of the present invention to provide an improved method of recording, storing, and reproducing information which has the above-mentioned characteristics.

A further object of the invention is to provide an improved method of recording, storing and reproducing information in which use is made of a storage member having magneto-strictive properties.

A still further object of the invention is a method of recording information which consists in producing localised variations in the induced or remanent magnetism in a body of magneto-strictive material.

Figures 1, 2, 3, 4, 5:
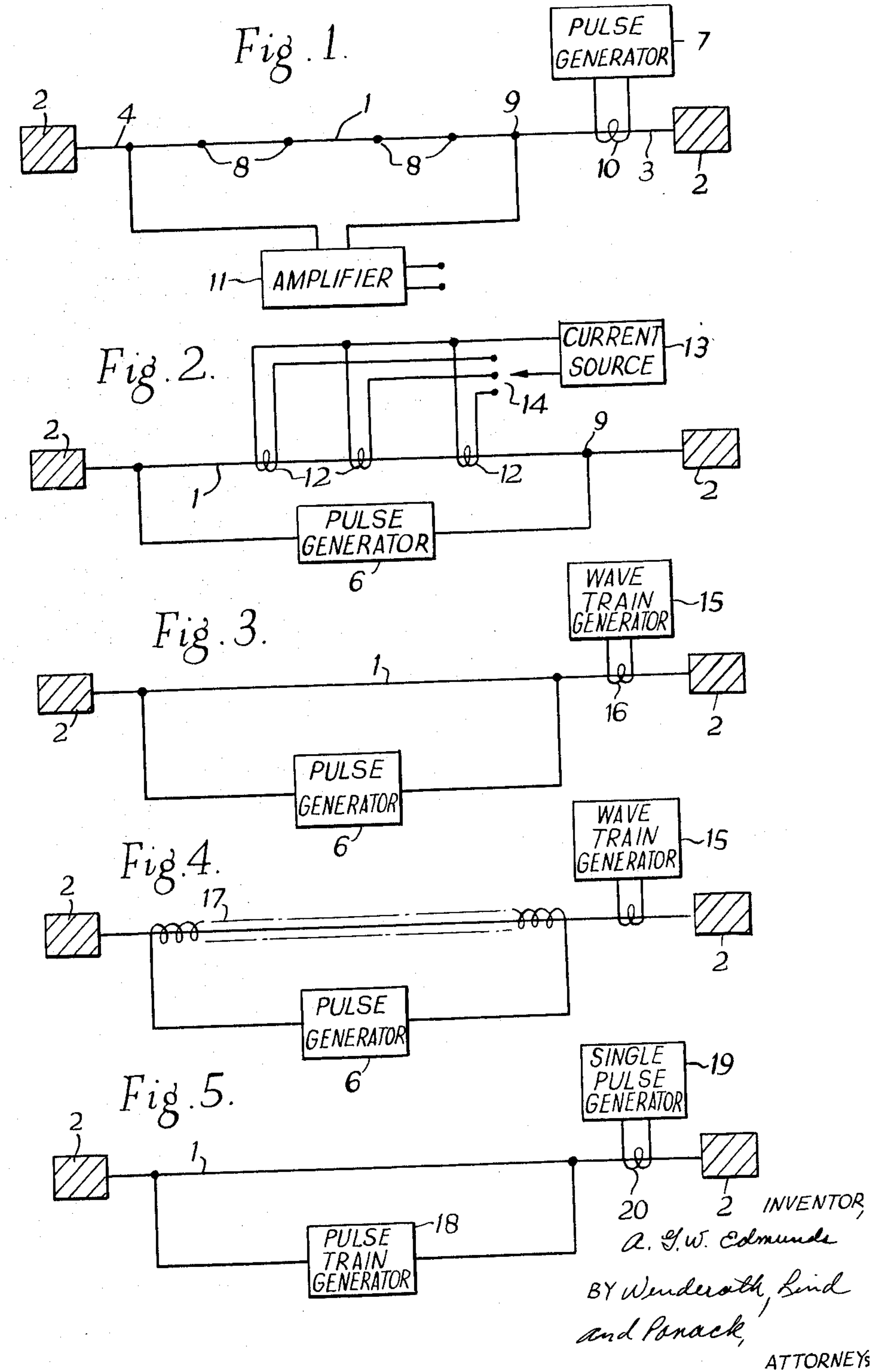
Figure 6:
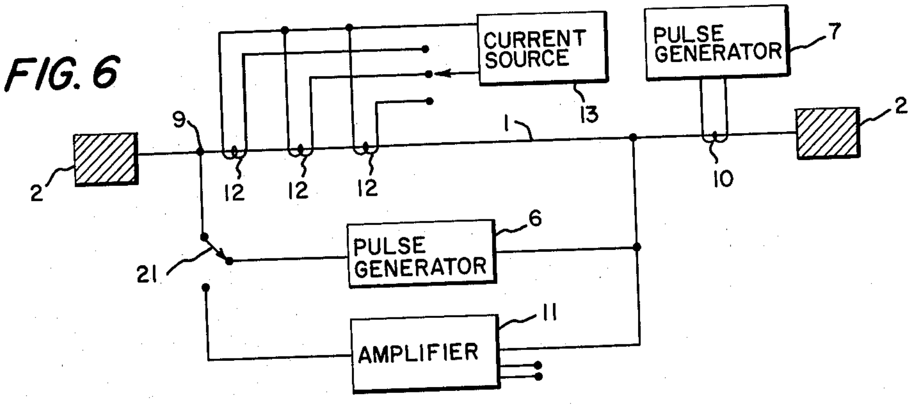
Figure 7:
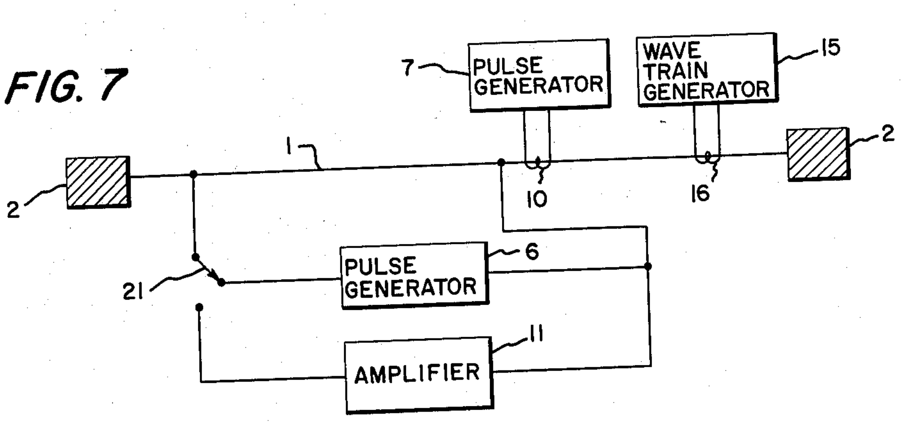
Figure 8:
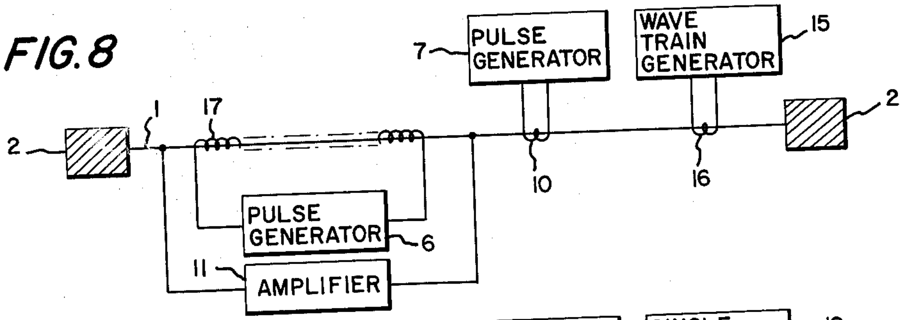
Figure 9:
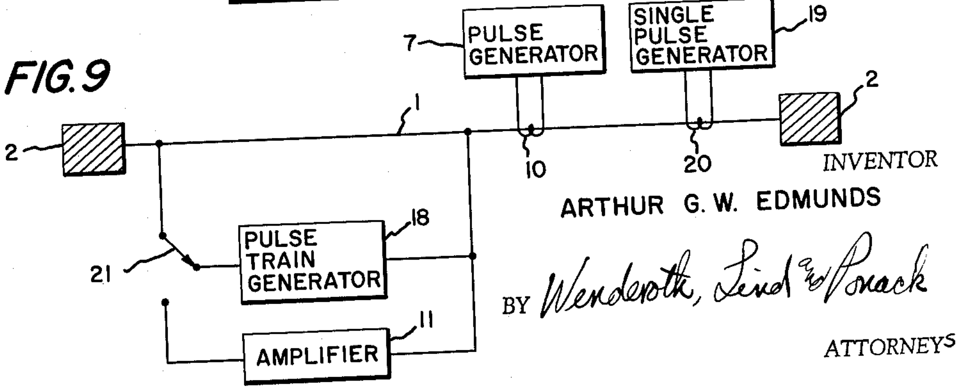

Other objects and advantages of the improved information recording and reproducing system of this invention will become apparent during the course of the following description with reference to the accompanying drawings, in which:

FIGURE 1 shows diagrammatically one form of the system,

FIGURE 2 shows diagrammatically one method of recording information in the system of FIGURE 1, FIGURES 3, 4 and 5 show diagrammatically alternative methods of recording information, FIGURE 6 is a diagrammatic representation of the combination of the recording, storing and reproducing system of FIGS. 1 and 2, FIG. 7 is a diagrammatic representation of the combination of the recording, storing and reproducing system of FIGS. 1 and 3, FIGURE 8 is a diagrammatic representation of the combination of the recording, storing and reproducing system of FIGS. 1 and 4, and FIGURE 9 is a diagrammatic representation of the combination of the recording, storing and reproducing system of FIGS. 1 and 5.

Referring now to FIGURE 1, there is shown diagrammatically an arrangement in which the body on which information is to be stored is constituted by a wire 1 of magneto-strictive material which extends between suitable terminations 2 arranged in known manner to prevent reflection of mechanical waves at the ends of the wire. At one end 3 of the wire 1 is arranged a means for producing one or a series of mechanical waves in the wire. As shown, such means comprise an electric pulse generator 7 the output of which is coupled to the wire by means of a coil 10 surrounding the wire. Alternatively any suitable known form of electro-mechanical transducer may be coupled with the end of the wire to produce a mechanical wave therein on the application of an electric signal. The input terminals of an electric amplifier 11 are connected respectively with the other end 4 of the wire and a point 9 thereon.

In such arrangement if the wire 1 is formed in some suitable way at points on its length with localised discontinuities, indicated diagrammatically at 8, on its magnetic state, and a mechanical wave is launched down the wire from the end 3 by means of an electric pulse from generator 7, the interaction of the mechanical wave with a single discontinuity or each discontinuity will produce a momentary electric current in the wire.

Owing to the finite time of propagation of the mechanical wave along the wire, the output of amplifier 11, after the generation of a pulse by generator 7, will consist of a number of signals separated by intervals of time corresponding to the number of discontinuities and their spacing along the wire.

The arrangement may thus be used as a store for information since such information may be applied to the body according to the spatial arrangement of a series of local discontinuities in its magnetic condition and the information so stored may be read by the application of a mechanical wave as a series of electric signals.

The access time of the improved storage system is very short and the stored information is substantially permanent although in some forms of the system it may be erased when not required.

It will be appreciated that in the operation of the system the pulse generator 7 may be arranged to produce single pulses when it is desired to read the information stored in the wire. Alternatively, this generator may be arranged to produce a series of short electric pulses which are spaced in time by intervals which are somewhat greater than the time taken for the mechanical wave to propagate through the length of the wire.

It has been found that the discontinuities in the body need not necessarily be applied magnetically since if the body is stressed locally either by heating or mechanically as by bending, by forming notches in it, or otherwise, mechanical waves will also be formed in the wire as the field is changed.

It will be appreciated that the body need not necessarily be formed as a wire and could alternatively consist, for example, of a rod or tube.

The magnetic discontinuities in the body may be produced, for example, by altering the intensity and/or by reversing the direction of remanent magnetisation of the body at selected points. While the wire may be magnetised locally in any direction, for example transversely or longitudinally, an effective method is to magnetise the body in such a way as to produce a local magnetic field having closed lines of force and substantially no external poles, which, for a circular wire, may be described as a circular magnetisation in a plane which is substantially perpendicular to the axis of its length. This form of magnetisation may be effected, for example, by the passage of an electric current through a short length of the wire as by discharging a condenser therethrough. It will be appreciated that in order to obtain sharply defined electric currents it is desirable that the local discontinuities shall consist of abrupt changes of magnetisation over a relatively short length of the body.

FIGURE 2 illustrates one convenient method of recording or writing information on to the magneto-strictive body. As in the arrangement of FIGURE 1, the body in the form of a magneto-strictive wire 1 extends between terminations 2 and a pulse generator 6 is connected between one end of the wire and a point 9 intermediate its ends. Arranged along the length of the wire at points at which it may be desired to produce a local discontinuity in the remanent magnetism are a plurality of coils 12 which can be connected individually to a source of current 13 through a switch 14. The arrangement is such that neither the magnitude of the field associated with the pulse from the pulse generator 6 nor that of the field produced by a coil 12 when energised with current from the source 13 is sufficient of itself to produce a permanent change in the remanent magnetism but if one of the coils 12 is connected with the source 13 and a pulse from the generator 6 is then passed through the wire, the combined effects of the two fields will be great enough to alter the remanent magnetism in the wire at the point at which the coil 12 is situated and the desired discontinuity in the remanent magnetism will thereby be produced.

FIGURE 3 shows an alternative method of recording information on to the body which, as in the previously described arrangements, consists of a magneto-strictive wire 1. In this case a generator 15 arranged to produce a train of waves corresponding in number and spacing to the number and spacing of the desired discontinuities on the wire is arranged to introduce a corresponding train of mechanical waves into the wire by means of the coil 16. As these waves travel along the wire a single electric pulse is produced by the pulse generator 6 whereupon discontinuities in the remanent magnetism are produced in the wire in the positions occupied by the individual mechanical waves at the instant the pulse from the generator 6 is passed through the wire.

Instead of passing the electric pulse from the generator 6 directly through the wire 1 it may be passed through a separate conductor which is arranged parallel with and close to the wire 1. Alternatitvely, as shown in FIGURE 4, the pulse from the generator 6 may be passed through a long coil 17 which surrounds the wire 1.

A further alternative arrangement is illustrated in FIGURE 5. In this case there is provided a pulse generator 18 which produces a train of electric pulses having the distribution it is desired to record on the wire 1. There is further provided a single pulse generator 19, corresponding to the generator 7 of FIGURE 1, which is coupled to the wire through a coil 20 and is effective to cause a single mechanical wave to travel along the wire. Corresponding to the operation of the arrangement of FIGURE 3, it is found that a discontinuity in the remanent magnetism of the wire is produced at each point along it where the single travelling mechanical wave is overtaken by an electric pulse from the generator 18.

While in the above description with reference to the drawings, the reading out function has been described with reference to FIGURE 1 while the recording function has been described with reference to FIGURES 2 to 5, it will be appreciated that both functions may be combined in a complete equipment. Thus the apparatus of FIGURE 5 may be combined with the apparatus of FIGURE 1, as shown in FIG. 9, a suitable switch 21 being introduced to connect either the pulse train generator 18 of FIGURE 5 or the amplifier 11 of FIGURE 1 with the magneto-strictive wire 1, while the single pulse generator 19 of FIGURE 5 may be substantially identical with the pulse generator 7 of FIGURE 1 and a single piece of equipment used for both purposes.

Likewise, the apparatus of FIG. 2 may be combined with the apparatus of FIG. 1, as shown in FIG. 6, a suitable switch 21 likewise being included to connect either the pulse generator 6 of FIG. 2 or the amplifier 11 of FIG. 1 with the magneto-strictive wire 1.

Similarly, the apparatus of FIG. 3 can be combined with the apparatus of FIG. 1, as shown in FIG. 7, and the switch 21 also included for switching to either the pulse generator 6 or the amplifier 11. On the other hand, when the apparatus of FIG. 4 is combined with the apparatus of FIG. 1, as shown in FIG. 8, no switch need be used, since the pulse generator 6 is not directly connected to the magneto-strictive wire 1.

In carrying the invention into effect it may be found that difficulties are encountered owing to the unsuitability of the magneto-strictive material used. In particular it may be found that when reading spurious signals are produced which make it difficult to recognise the required signals. Such effects are believed to be due to variations in magnetic properties along the wire. It has been found that if the wire is first stretched beyond its elastic limit to give a permanent extension of about 0.5% of its initial length and the wire is then annealed (but not enough to cause too large a crystal growth since large crystals themselves produce spurious signals) and this stretching-annealing cycle is repeated, say, ten times, a great improvement in the uniformity of the wire as regards its magnetic properties is obtained.

A further difficulty may arise owing to the fact that a particular specimen of magneto-strictive material may have an appreciable temperature coefficient of velocity of propagation of mechanical waves. This coefficient may be reduced towards zero in selected material by applying a treatment which consists in annealing a specimen of nickel-iron alloy containing about 45% nickel, stretching it beyond its elastic limit by a predetermined amount, and then applying heat treatment at a low tempearture of around 100° C.

If both the above treatments are to be applied the technique is to apply, say, ten cycles of the treatment to remove non-uniformity of magnetic remanence finishing off with a final stretch and heat treatment designed to adjust the temperature coefficient. If is is found that an unsuitable degree of final stretch is required to achieve the required result, then the selection of an alloy having a different percentage of nickel is indicated.

I claim:

1. Apparatus for recording, storing and reproducing information comprising an elongated member of magneto-strictive material supported at non-reflecting terminations, recording means including means for producing localised variations in the magnetic condition of said member at spatially arranged points thereon, reproducing means including means for passing a mechanical wave through said member, and an electric amplifier, and a single electrically conductive connection connected directly to said member at each of two points on said member with said localized variations between said points and with the other ends of said single connection coupled to said amplifier, said amplifier detecting and amplifying electric currents produced therein.

2. Apparatus according to claim 1, said reproducing means including a pulse generator having an output winding coupled with said member adjacent one end thereof.

3. Apparatus according to claim 1, said recording means including a wave train generator coupled with said member at one end thereof to produce a train of mechanical waves in said member and a pulse generator connected with the ends of said member for passing an electric pulse through said member.

4. Apparatus for storing and reproducing information, comprising an elongated member of magneto-strictive material having information stored therein as a series of variations in the magnetic condition of said member arranged spatially along a first part of said member, means comprising an electric pulse generator having an output winding coupled with a second part of said member for propagating a mechanical wave through said first part of said member, an amplifier and a single electrically conductive connection connected directly with the ends of said first part of said member and coupled to said amplifier, said amplifier amplifying electric currents generated in said member when said mechanical wave interacts with each variation of said series of variations.

5. Apparatus as claimed in claim 1 and further comprising means for recording information on said first part of said member, said last-mentioned means comprising means for producing localized variations in the magnetic field in said member and arranged at spatially disposed points on said first part of said member, and means for producing additional change in magnetic field in said member comprising a pulse generator connected across said first part of said member for passing an electric pulse through said first part of said member.

6. Apparatus as claimed in claim 4 and further comprising means for recording information on said first part of said elongated member, said last-mentioned means comprising means coupled to the said second part of said member for passing a mechanical wave through said member, and pulse train generating means connected across said first part of said member for passing a train of electric pulses through said first part of said member.

References Cited by the Examiner

UNITED STATES PATENTS

| | | | |
|---|---|---|---|
| 2,736,881 | 2/1956 | Booth | 340—174 |
| 2,790,160 | 4/1957 | Millership | 340—174 |
| 3,016,524 | 1/1962 | Edmunds | 340—174 |

IRVING L. SRAGOW, *Primary Examiner.*

R. J. McCLOSKEY, V. P. CANNEY, *Assistant Examiners.*